United States Patent
Usui et al.

(10) Patent No.: US 7,331,826 B2
(45) Date of Patent: Feb. 19, 2008

(54) ELECTRIC DISK BRAKE

(75) Inventors: Takuya Usui, Minami Alps (JP);
Toshio Takayama, Kai (JP); Masaru Sakuma, Kai (JP)

(73) Assignee: Hitachi, Ltd., Tokyo (JP)

( * ) Notice: Subject to any disclaimer, the term of this patent is extended or adjusted under 35 U.S.C. 154(b) by 151 days.

(21) Appl. No.: 11/090,055

(22) Filed: Mar. 28, 2005

(65) Prior Publication Data
US 2006/0021832 A1    Feb. 2, 2006

(30) Foreign Application Priority Data
Jul. 30, 2004    (JP) ............................. 2004/223704

(51) Int. Cl.
*H01R 13/64* (2006.01)

(52) U.S. Cl. ...................... 439/680; 439/677

(58) Field of Classification Search ................ 439/633, 439/674, 677, 680
See application file for complete search history.

(56) References Cited

U.S. PATENT DOCUMENTS

| | | | |
|---|---|---|---|
| 2,563,712 A * | 8/1951 | Frei et al. ................... | 439/279 |
| 3,077,571 A * | 2/1963 | Curtis et al. ............... | 439/680 |
| 4,245,875 A * | 1/1981 | Shaffer et al. ............. | 439/144 |
| 4,611,878 A * | 9/1986 | Hall et al. .................. | 439/610 |
| 5,888,083 A * | 3/1999 | Seilhan et al. ............. | 439/161 |
| 6,491,140 B2 * | 12/2002 | Usui et al. .................. | 188/72.1 |

FOREIGN PATENT DOCUMENTS

JP    2002-13562    1/2002

* cited by examiner

Primary Examiner—Tho D. Ta
Assistant Examiner—Travis Chambers
(74) Attorney, Agent, or Firm—Wenderoth, Lind & Ponack, L.L.P.

(57) ABSTRACT

The present invention provides an electric disk brake which enables an operation for wiring the harness to be easily conducted without the risk of lowering production efficiency. A caliper body-side connector 26 which, together with a harness-side connector 24 of a harness 23, forms a connector 25, is provided in a caliper body 3. In the caliper body-side connector 26, first to fourth lead-out terminals 30a to 30d connected to an electric portion for an electric motor are arranged in this order from a first side portion 20a towards a third side portion 20c of a cover 20. In the harness-side connector 24, a first set of first to fourth harness-side terminals and a second set of first to fourth harness-side terminals independently connected to the first to fourth lead-out terminals 30a to 30d are arranged in reverse order. When an electric disk brake 1 is used for each of the left rear wheel and the right rear wheel, one of the first set of first to fourth harness-side terminals and the second set of first to fourth harness-side terminals is used for the left rear wheel while the other is used for the right rear wheel, and the first to fourth lead-out terminals and the first to fourth harness-side terminals are connected. The harnesses 23 extend in the same direction relative to the vehicle, thus ensuring ease of operation for wiring the harnesses 23.

16 Claims, 16 Drawing Sheets

ELECTRIC DISK BRAKE

BACKGROUND OF THE INVENTION

The present invention relates to an electric disk brake for generating a braking force by means of an electric motor provided in a caliper body.

An example of a conventional electric disk brake is disclosed in Japanese Patent Application Public Disclosure No. 2002-013562. In the electric disk brake of this document, electric portions for an electric motor provided in a caliper body (such as a stator coil of the electric motor and a rotation sensor) and a predetermined number of wires provided in a harness which supplies driving currents to the electric portions, and which conducts signal transmission from the electric portions, are connected and disconnected by means of a connector. The connector comprises a caliper body-side connector (a receptacle) provided in the caliper body and a harness-side connector (a plug) provided in the harness.

The caliper body-side connector includes a predetermined number of lead-out terminals which are connected through wires to the electric portions for the electric motor. The lead-out terminals are connected to and disconnected from harness-side terminals connected to the predetermined number of wires provided in the harness, due to connection and disconnection between the caliper body-side connector and the harness-side connector.

In this electric disk brake, the harness can be easily detached from the caliper body, so that the harness does not become obstructive during attachment of the caliper body to a vehicle, or during maintenance or inspection, thus improving operability.

However, the above-mentioned conventional electric disk brake has the following problems. The harness is provided at a central portion of the caliper body as viewed in a direction of rotation of the disk, and extends obliquely in an upward direction relative to an axial direction of the disk. This increases the length of the caliper body, including the harness, in the axial direction of the disk. To solve this problem, it is considered to arrange the harness to extend in one direction of rotation of the disk in parallel with the disk surface. In this case, however, when the electric disk brake is mounted for each of the left and right wheels, the harness of the electric disk brake for the left wheel and the harness of the electric disk brake for the right wheel extend in different directions. That is, in the above-mentioned electric disk brake, if the harness extends towards the front side of the vehicle when the electric brake is mounted for the right wheel, the harness extends towards the rear side of the vehicle when the electric disk brake is mounted for the left wheel. Therefore, the above-mentioned electric disk brake is problematic in that when the disk brake is mounted for each of the left wheel and the right wheel, a wiring operation for the harnesses cannot be easily conducted. It is desirable to solve this problem.

As a countermeasure, it is considered to prepare a caliper body and a harness both exclusive for each of the left wheel and the right wheel so that the harness of the electric disk brake mounted for the left wheel and the harness of the electric disk brake mounted for the right wheel extend in the same direction. In this case, however, a plurality of types of components (i.e., caliper bodies and harnesses) must be prepared; with the result that production efficiency is impaired. Therefore, the above-mentioned countermeasure is not satisfactory.

SUMMARY OF THE INVENTION

In such a situation, the present invention has been made. It is an object of the present invention to provide an electric disk brake which enables an operation for wiring the harness to be easily conducted without the risk of lowering production efficiency.

The present invention provides an electric disk brake which is adapted to generate a braking force by means of an electric motor provided in a caliper body and in which electric portions for said electric motor and a predetermined number of wires provided in a harness are connected and disconnected by means of a connector, wherein:

said connector comprises a caliper body-side connector and a harness-side connector respectively provided in said caliper body and said harness;

said caliper body-side connector includes a set of a predetermined number of caliper body-side terminals connected to said electric portion for the electric motor;

said harness-side connector includes a set of a predetermined number of harness-side terminals connected to one end of each of said predetermined number of wires;

one of the set of the caliper body-side terminals and the set of the harness-side terminals includes a pair of sets of terminals connected to said electric portion for the electric motor or said one end of the wires, said pair of sets of terminals forming a first set of terminals and a second set of terminals;

said first set of terminals and said second set of terminals are provided in two rows in reverse order relative to each other in terms of an order of arrangement of terminals; and the other of the set of the caliper body-side terminals and the set of the harness-side terminals is connected to either the first set of terminals or the second set of terminals of said one of the set of the caliper body-side terminals and the set of the harness-side terminals, depending on directions of said caliper body-side connector and said harness-side connector when they are fittingly connected to each other.

According to the present invention, when the same types of caliper bodies are mounted for use with the left wheel and the right wheel of a vehicle, the harnesses can be connected to the caliper bodies so as to be disposed in the same direction. Therefore, ease of operation for wiring the harnesses can be ensured.

Further, to achieve an easy wiring operation by disposing the harnesses in the same direction can be realized without preparing caliper bodies of different structures corresponding to the left and the right wheels. Since it is unnecessary to prepare a plurality of types of caliper bodies, production efficiency can be increased.

The present invention also provides an electric disk brake which is adapted to generate a braking force by means of an electric motor provided in a caliper body and in which an electric portion for said electric motor and a predetermined number of wires provided in a harness are connected and disconnected by means of a connector, wherein:

said connector comprises a caliper body-side connector and a harness-side connector respectively provided in said caliper body and said harness;

said caliper body-side connector includes a set of a predetermined number of caliper body-side terminals connected to said electric portion for the electric motor;

said harness-side connector includes a set of a predetermined number of harness-side terminals connected to one end of each of said predetermined number of wires; and either one of said harness and said caliper body includes two types, one of the two types being formed such that the predetermined number of terminals of the connector are arranged in a first direction and the other type being formed such that the predetermined number of terminals of the connector are arranged in a direction opposite to said first direction.

According to the present invention, when the caliper bodies are mounted for the left wheel and the right wheel of a vehicle, the harnesses can be disposed in the same direction. Therefore, ease of operation for wiring the harnesses can be ensured.

Further, to achieve an easy wiring operation by disposing the harnesses in the same direction can be realized simply by changing part of the harness-side or the caliper body-side connector, resulting in high production efficiency.

The present invention further provides an electric disk brake which is adapted to generate a braking force by means of an electric motor provided in a caliper body and in which a harness fixing part for holding a harness is attached to and detached from the caliper body, to thereby selectively effect connection and disconnection between an electric portion for said electric motor and said harness having one end thereof connected to the harness fixing part, wherein:

said harness fixing part is capable of being attached to and detached from the caliper body at a plurality of positions so that said harness fixing part extends along a plane orthogonal to a direction of attachment and detachment of the harness fixing part.

According to the present invention, when the caliper bodies are mounted for the left wheel and the right wheel of a vehicle, the harness fixing parts corresponding to the directions of the caliper bodies mounted for the left wheel and the right wheel are attached to the caliper bodies. Thus, the directions of the harnesses relative to the caliper bodies can be adjusted so that the harnesses can be disposed in the same direction. With this arrangement, ease of operation for wiring the harnesses can be ensured.

DETAILED DESCRIPTION OF THE INVENTION

Figure 1:
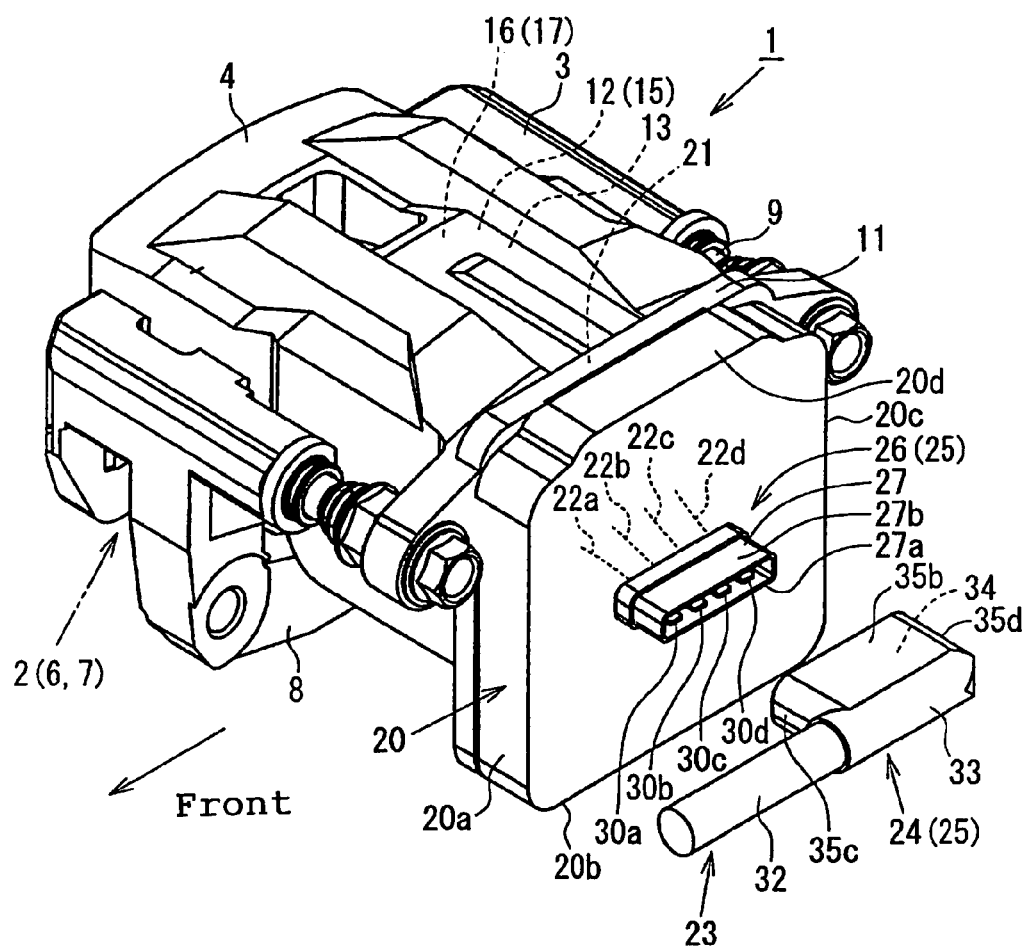
FIG. 1 is a disassembled perspective view schematically showing a disposition of an electric disk brake according to a first embodiment of the present invention when mounted for the right rear wheel of a vehicle.
Figure 2:
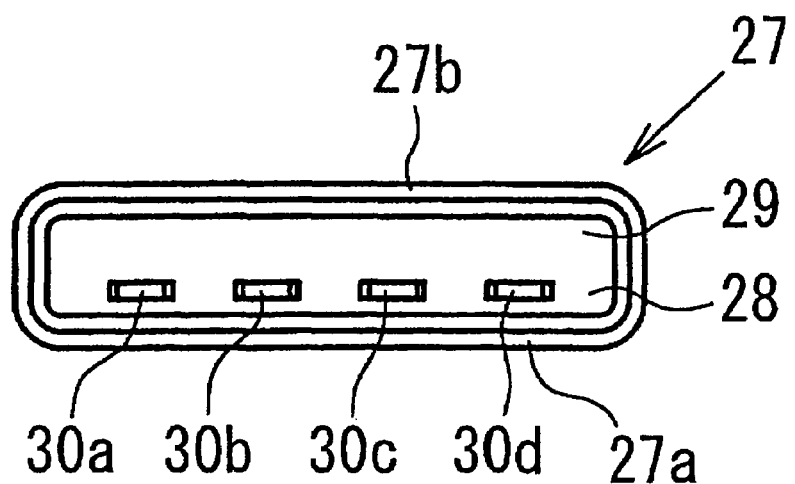
FIG. 2 is a plan view showing a caliper body-side connector shown in FIG. 1.
Figure 3:
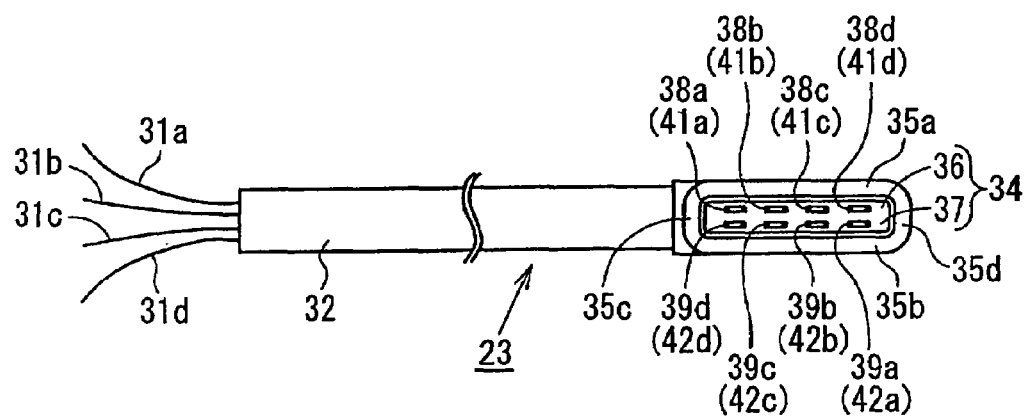
FIG. 3 is a front view showing a harness shown in FIG. 1.

Hereinbelow, referring to FIGS. 1 to 5, an electric disk brake according to a first embodiment of the present invention is described. In FIGS. 1 to 3, in an electric disk brake 1, a caliper body 3 is disposed on one side of a disk rotor 2 that rotates with a wheel (normally, an inner side relative to a vehicle body). The caliper body 3 is formed with a generally C-shaped claw portion 4 extending over the disk rotor 2 to the opposite side of the disk rotor. Brake pads 6 and 7 are disposed on opposite sides of the disk rotor 2; that is, between the disk rotor 2 and the caliper body 3 and between the disk rotor 2 and a forward end portion of the claw portion 4. The brake pads 6 and 7 are supported by a carrier 8 that is fixed to the vehicle body so as to be capable of moving in an axial direction of the disk rotor 2. The carrier 8 is adapted to receive a braking torque. Further, the caliper body 3 is slidably guided in the axial direction of the disk rotor 2 by means of slide pins 9 attached to the carrier 8. In FIG. 1, a pin boot provided so as to extend between the carrier 8 and the slide pin 9 is omitted.

The caliper body 3 is provided with a generally cylindrical case 11. The case 11 accommodates an electric motor 12 and a rotation sensor 13 for sensing a position of a rotor 15 of the electric motor 12 during rotation. The caliper body 3 is further provided with a rotary-linear motion converting mechanism 17 which is adapted to covert rotation of the rotor 15 of the electric motor 12 to a linear motion and enables a forward/rearward movement of a piston 16 disposed so as to face the brake pad 6. According to the forward movement of the piston 16, the brake pads 6 and 7 are pressed against the disk rotor 2, to thereby generate a braking force.

A substantially rectangular cover 20 having first to fourth side portions 20a to 20d is attached to a rear end portion of the case 11. The cover 20 is attached to the case 11 in a state such that the opposing first and third side portions 20a and 20c are in parallel with a radial direction of the disk rotor 2 (a vertical direction in FIG. 1).

The caliper body 3 further accommodates a control substrate 21 connected to the electric motor 12 and the rotation sensor 13. The caliper body 3 is provided with two wires from a power supply to the electric motor 12, the rotation sensor 13 and the control substrate 21 and two signal wires for controlling the electric motor 12 and transmitting an output from the rotation sensor 13. Hereinbelow, for convenience, these wires from the power supply and the signal wires are referred to as "the body-side wires". The four body-side wires are referred to as "the first to fourth body-side wires 22a to 22d", respectively.

In this embodiment, the electric motor 12, the rotation sensor 13 and the control substrate 21 form electric portions for an electric motor.

A caliper body-side connector 26 is provided at a central portion of the cover 20. The caliper body-side connector 26, together with a harness-side connector 24 provided in a harness 23, forms a connector 25.

The caliper body-side connector 26 comprises a rectangular ring-like caliper body-side connector body 27, which is formed in the cover 20 and extends in an upright position relative to the cover 20. One of two long side wall portions of the caliper body-side connector body 27 (a caliper-side first long side portion 27a) and the other long side wall portion (a caliper-side second long side portion 27b) are in parallel to the second side portion 20b and the fourth side portion 20d of the cover 20. The caliper-side first long side portion 27a is disposed on a side of the second side portion 20b of the cover 20. First to fourth lead-out terminals in pin-like forms (caliper body-side terminals) 30a to 30d, which are respectively connected to the first to fourth body-side wires 22a to 22d, are provided in a region 28 (see FIG. 2; hereinafter, referred to as "the caliper-side first long side portion side region 28") adjacent to the caliper-side first long side portion 27a in the caliper body-side connector body 27. The terminals 30a to 30d are fixed to the caliper body 3 or the cover 20. The first to fourth lead-out terminals 30a to 30d are arranged in this order from the first side portion 20a towards the third side portion 20c of the cover 20.

A region adjacent to the caliper-side second long side portion 27b in the caliper body-side connector body 27 is referred to as "the caliper-side second long side portion side region 29".

The harness 23 comprises four harness-side wires (hereinafter referred to as "the first to fourth harness-side wires") 31a to 31d, which are respectively connected to the first to fourth lead-out terminals 30a to 30d (the first to fourth body-side wires 22a to 22d) as described later, a harness cylinder portion 32 for insertion of the first to fourth harness-side wires 31a to 31d and the above-mentioned harness-side connector 24, which is attached to one end of the harness cylinder portion 32 so as to communicate with an inside of the harness cylinder portion 32. The harness-side connector 24 comprises a harness-side connector body 33 in a rectangular ring-like form, with a basal end thereof being supported by the harness cylinder portion 32 and a forward end thereof being fitted over the caliper body-side connector body 27, and a harness-side connector body inner substrate 34 disposed in the harness-side connector body 33 and held by the harness-side connector body 33.

For convenience, in the harness-side connector body 33, of two long side wall portions arranged in a direction of short sides, the long side wall portion located on an upper side in FIG. 3 (a lower side in FIG. 1) is referred to as "the harness-side first long side portion 35a", and the long side wall portion located on a lower side in FIG. 3 (an upper side in FIG. 1) is referred to as "the harness-side second long side portion 35b". Of two short side portions of the harness-side connector body 33, the short side portion located on a side of the harness cylinder portion 32 is referred to as "the harness-side first short side portion 35c", and the other short side portion is referred to as "the harness-side second short side portion 35d". A region adjacent to the harness-side first long side portion 35a and a region adjacent to the harness-side second long side portion 35b in the harness-side connector body 33 are referred to as "the harness-side first long side portion side region 36" and "the harness-side second long side portion side region 37", respectively. Four openings for insertion of the first to fourth lead-out terminals 30a to 30d are arranged in a row, and two such rows of openings are formed in the harness-side first long side portion side region 36 and the harness-side second long side portion side region 37 in the harness-side connector body inner substrate 34.

The four openings which are arranged in the harness-side first long side portion side region 36 from the harness-side first short side portion 35c towards the harness-side second short side portion 35d are hereinafter frequently referred to as "the first-row first to fourth openings 38a to 38d", to describe this order of arrangement. The four openings which are arranged in the harness-side second long side portion side region 37 from the harness-side second short side portion 35d towards the harness-side first short side portion 35c are hereinafter frequently referred to as "the second-row first to fourth openings 39a to 39d", to describe this order of arrangement.

One end of each of the first to fourth harness-side wires 31a to 31d is bifurcated, and the bifurcated ends are respectively connected to two harness-side terminals. One of the two terminals connected to each of the first to fourth harness-side wires 31a to 31d forms first-set first to fourth harness-side terminals 41a to 41d. The other terminal forms second-set first to fourth harness-side terminals 42a to 42d. The harness-side terminals 41a to 41d and 42a to 42d are formed as enclosure-type terminals for enclosing the first to fourth lead-out terminals 30a to 30d or clip-type terminals for sandwiching the first to fourth lead-out terminals 30a to 30d.

The first-set first to fourth harness-side terminals 41a to 41d are partially projected inside the first-row first to fourth openings 38a to 38d. By inserting the first to fourth lead-out terminals 30a to 30d into the first-row first to fourth openings 38a to 38d, the first-set first to fourth harness-side terminals 41a to 41d are electrically connected to the first to fourth lead-out terminals 30a to 30d. The second-set first to fourth harness-side terminals 42a to 42d are partially projected inside the second-row first to fourth openings 39a to 39d. By inserting the first to fourth lead-out terminals 30a to 30d into the second-row first to fourth openings 39a to 39d, the second-set first to fourth harness-side terminals 42a to 42d are electrically connected to the first to fourth lead-out terminals 30a to 30d.

The first-set first to fourth harness-side terminals 41a to 41d and the second-set first to fourth harness-side terminals 42a and 42d, which are disposed in two rows, are in reverse order relative to each other in terms of an order of arrangement and independently connected to the first to fourth lead-out terminals 30a to 30d. That is, the first-set first harness-side terminal 41a and the second-set first harness-side terminal 42a, both of which are connected to the first harness-side wire 31a, are disposed with a relation of point symmetry with respect to the center of the substrate 34 (the connector 33). Similarly, the terminals 41b and 42b, the terminals 41c and 42c, and the terminals 41d and 42d are disposed with a relation of point symmetry with respect to the center of the substrate 34 (the connector 33).

Figure 4:
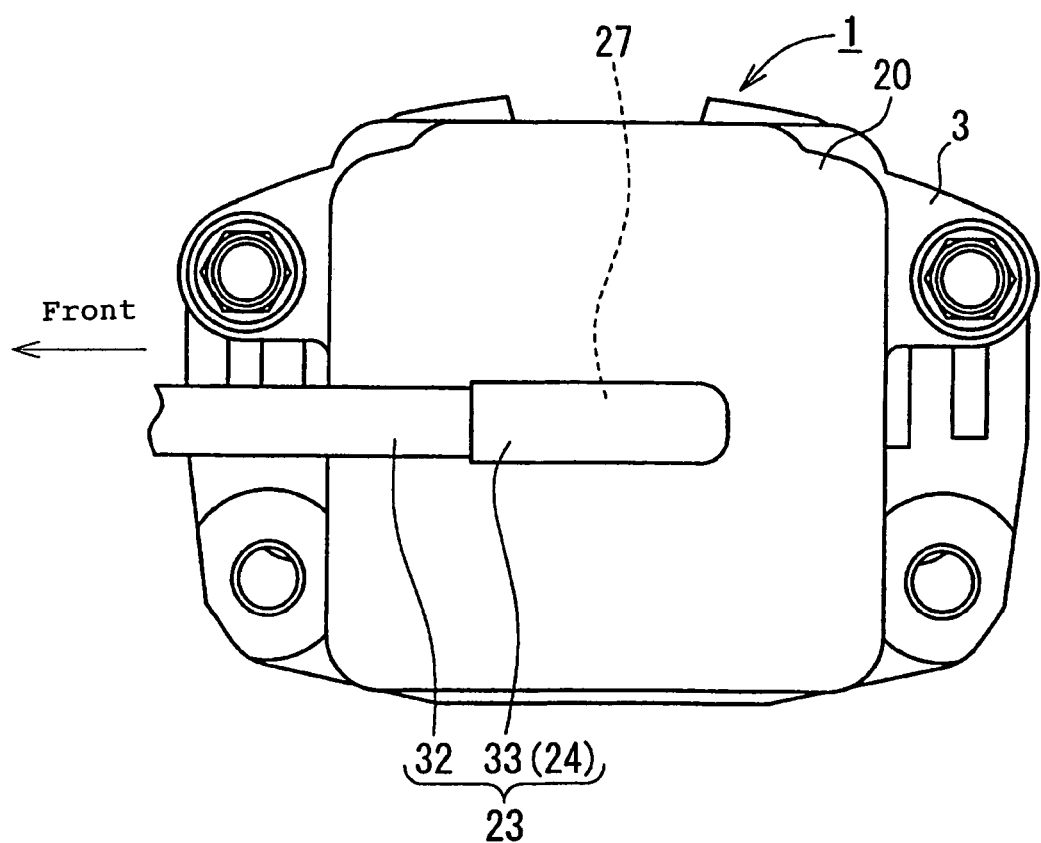
FIG. 4 is a rear view of the electric disk brake of FIG. 1 when mounted for the right rear wheel of the vehicle, with the harness being attached thereto.

FIG. 1 and FIG. 4 indicate the electric disk brake 1 when mounted for use with the right rear wheel (not shown). In this state, the cover 20 is disposed such that the first and third side portions 20a and 20c are located on the front side and the rear side of the vehicle, respectively, with the first to fourth lead-out terminals 30a to 30d being arranged in this order from the front side towards the rear side of the vehicle, and the harness 23 is attached to the caliper body 3 so that the harness cylinder portion 32 extends towards the front side of the vehicle.

If the electric disk brake 1 is mounted for use with the left rear wheel (in this case the first side portion 20a of the cover 20 faces the rear side of the vehicle), with the harness 23 being attached to the caliper body 3 in the same manner as indicated in FIG. 1, the harness cylinder portion 32 is directed towards the rear side of the vehicle. That is, the direction of the harness cylinder portion 32 becomes opposite to that when the electric disk brake 1 is mounted for use with the right rear wheel (FIG. 1). This impairs a smooth operation for wiring the harness 23.

Figure 5:
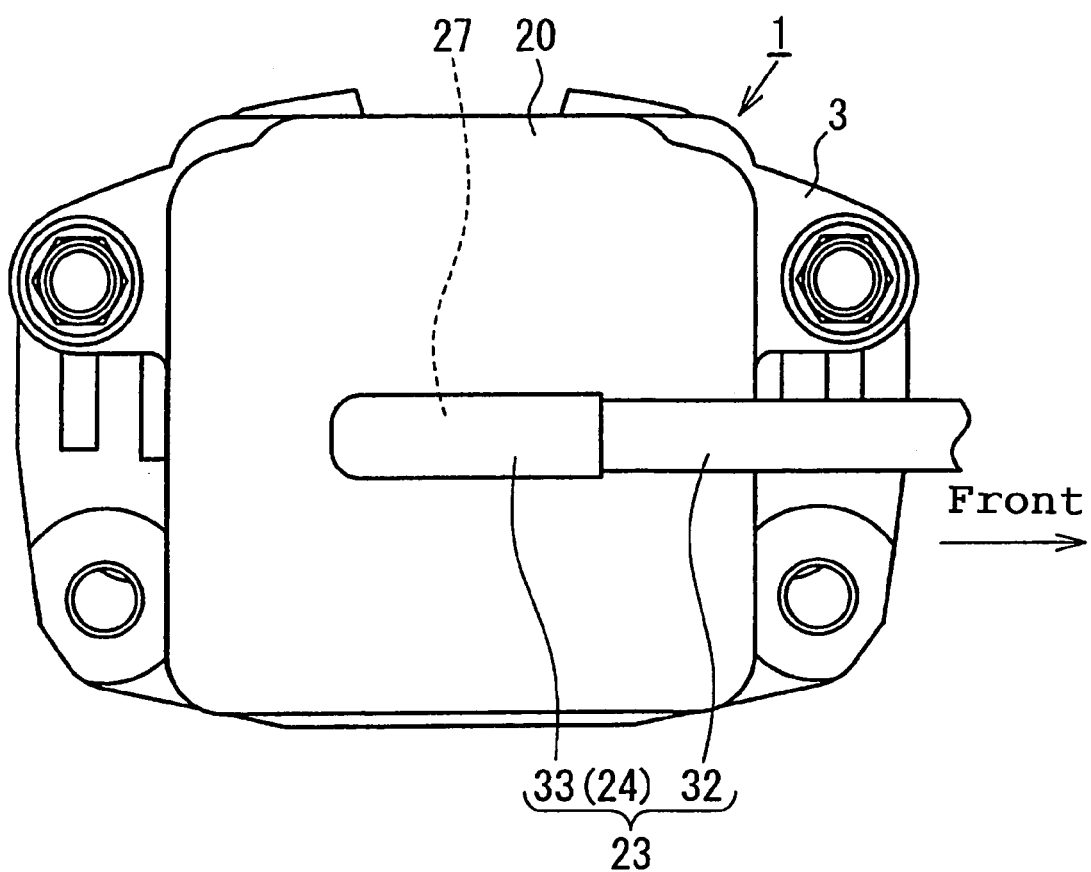
FIG. 5 is a rear view of the electric disk brake of FIG. 1 when mounted for the left rear wheel of the vehicle, with the harness being attached thereto.

In the first embodiment, when the electric disk brake 1 is mounted for use with the left rear wheel (that is, the first to fourth lead-out terminals 30a to 30d are arranged in this order from the rear side towards the front side of the vehicle), as indicated in FIG. 5, the harness-side connector body 33 is fitted over the caliper body-side connector body 27 such that the harness cylinder portion 32 extends towards the front side of the vehicle, and the first to fourth lead-out terminals 30a to 30d (see FIG. 1) are inserted into the second-row first to fourth openings 39a to 39d and connected to the second-set first to fourth harness-side terminals 42a to 42d (see FIG. 3). By connecting the first to fourth lead-out terminals 30a to 30d to the second-set first to fourth harness-side terminals 42a to 42d in the above-mentioned manner, the same electrical connecting relationship between the harness 23 and the electric portions for the electric motor as in the case of FIG. 1 can be obtained. In this instance, the harness cylinder portion 32 extends towards the front side of the vehicle as in the case of FIG. 1 in which the electric disk brake 1 is mounted for use with the right rear wheel. Therefore, ease of operation for wiring the harness 23 can be ensured.

Further, an easy wiring operation can be achieved by disposing the harnesses 23 in the same direction, without preparing caliper bodies of different structures corresponding to the left and the right wheels. Since it is unnecessary to prepare a plurality of types of caliper bodies, production efficiency can be increased. This also applies to other embodiments of the present invention that are described later.

The arrangements of the caliper-side terminals and the harness-side terminals in the above embodiment may be reversed. That is, the caliper-side terminals may be provided in two rows in the caliper-side first long side portion side region 28 and the caliper-side second long side portion side region 29, with the respective rows being in reverse order relative to each other in terms of an order of arrangement of the terminals. In this case, the harness-side terminals are provided in a single row in either one of the harness-side first long side portion side region 36 and the harness-side second long side portion side region 37. Further, in the above embodiment, the caliper-side terminals are formed in pin-like configurations and the harness-side terminals are formed as an enclosure-type or a clip-type. However, the caliper-side terminals may be formed as an enclosure-type or a clip-type, with the harness-side terminals being formed in pin-like configurations.

In the first embodiment, four lead-out terminals (the first to fourth lead-out terminals 30a to 30d) are provided in a row. This does not limit the present invention. The number of lead-out terminals may be two, three or five or more. In the first embodiment, the first to fourth lead-out terminals 30a to 30d are arranged in one row, and the harness-side terminals are arranged in two rows (the first-set first to fourth harness-side terminals 41a to 41d and the second-set first to fourth harness-side terminals 42a to 42d) each corresponding to the first to fourth lead-out terminals 30a to 30d. However, in the present invention, the lead-out terminals may be arranged in two or more rows with the harness-side terminals being arranged in twice the number of rows than the number of rows of the lead-out terminals. This also applies to other embodiments that are described later.

Further, in the first embodiment, the caliper-side first and second long side portion side regions 28 and 29, and the harness-side first and second long side portion side regions 36 and 37, are divided into an upper side and a lower side as indicated in FIGS. 2 and 3. However, this does not limit the present invention. The long side portion side regions may be divided into a left side and a right side in FIGS. 2 and 3. In this case, two discrete regions may be formed on the left side and the right side. Otherwise, a first region and a second region may be formed for each of a plurality of terminals. In this case, a plurality of first regions and second regions may be alternately arranged in a single row, with the first region and the second region being disposed adjacent to each other.

Next, referring to FIGS. 6 to 11, an electric disk brake according to a second embodiment of the present invention is described. The same or corresponding members or portions as indicated in FIGS. 1 to 5 are designated by the same reference numerals and characters as used in FIGS. 1 to 5, and overlapping explanation thereof is omitted.

Figure 6:
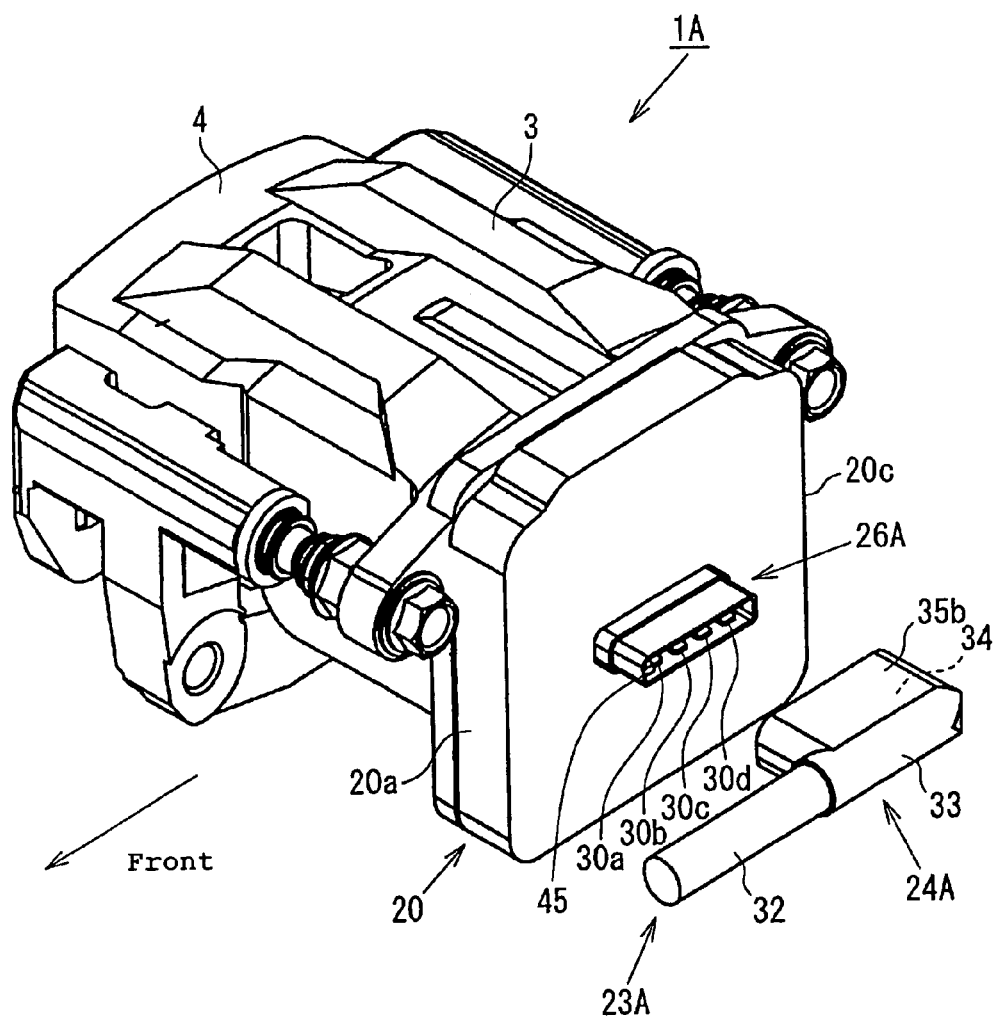
FIG. 6 is a disassembled perspective view schematically showing a disposition of an electric disk brake according to a second embodiment of the present invention when mounted for the right rear wheel of a vehicle.
Figure 7:
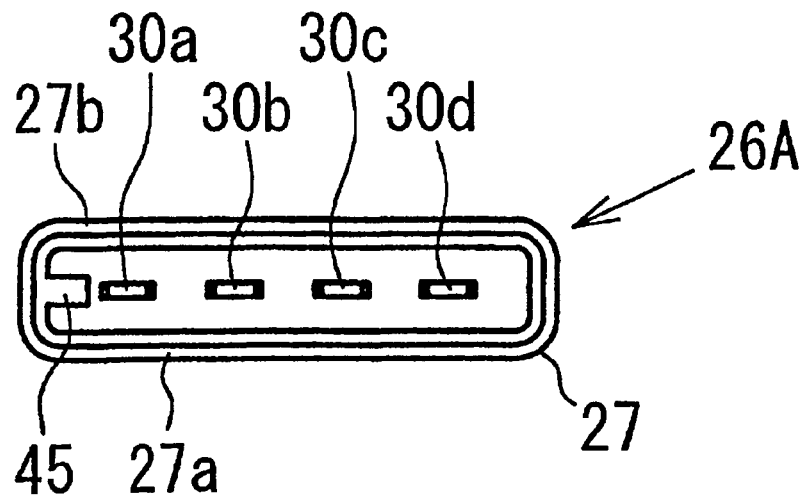
FIG. 7 is a plan view showing a caliper body-side connector shown in FIG. 6.
Figure 8:
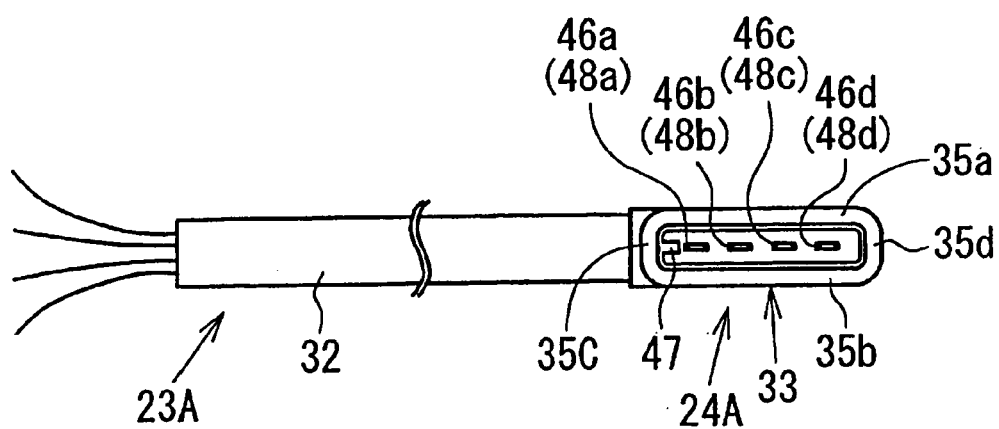
FIG. 8 is a front view showing a first harness shown in FIG. 6.
Figure 11:
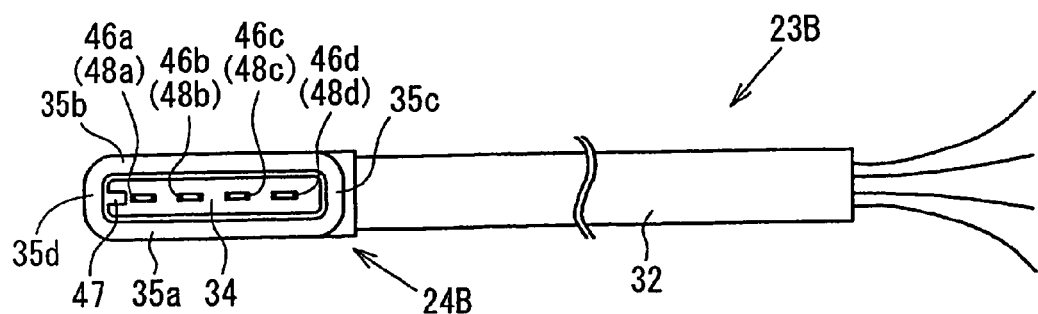
FIG. 11 is a front view showing the second harness used in the electric disk brake of FIG. 6 mounted for the left rear wheel of the vehicle.

An electric disk brake 1A according to the second embodiment mainly differs from the electric disk brake 1 in the first embodiment in that, as indicated in FIGS. 6 and 7, a caliper body-side connector 26A is provided, instead of the caliper body-side connector 26, and as indicated in FIGS. 8 and 11, first and second harnesses 23A and 23B of different types are prepared. The first harness 23A and the second harness 23B respectively comprise a harness-side connector 24A and a harness-side connector 24B different from the harness-side connector 24. The harness-side connector 24A and the harness-side connector 24B have different directions. In the caliper body-side connector 26A, a reference projection 45 is formed in the caliper body-side connector body 27 at a portion thereof adjacent to the first lead-out terminal 30a. The first to fourth lead-out terminals 30a to 30d are disposed in an intermediate region between the caliper-side first long side portion 27a and the caliper-side second long side portion 27b.

As indicated in FIGS. 8 and 11, the harness-side connectors 24A and 24B of the first and second harnesses 23A and 23B mainly differ from the harness-side connector 24 in the first embodiment (FIG. 3) in that first to fourth openings 46a to 46d are formed at an intermediate portion between the harness-side first long side portion 35a and the harness-side second long side portion 35b in the harness-side connector body inner substrate 34, instead of the first-row and second-row first to fourth openings 38a to 38d and 39a to 39d, a reference recess 47 for alignment is formed in the harness-side connector body inner substrate 34, into which the reference projection 45 is to be inserted, and first to fourth harness-side terminals 48a to 48d connected to the first to fourth harness-side wires 31a to 31d are provided, instead of the first-set and second-set first to fourth harness-side terminals 41a to 41d and 42a to 42d. The first to fourth harness-side terminals 48a to 48d correspond in position to the first to fourth openings 46a to 46d.

In the harness-side connector 24A of the first harness 23A, as indicated in FIG. 8, the first to fourth openings 46a to 46d, and hence the first to fourth harness-side terminals 48a to 48d, are arranged in this order in a first direction from a harness-side first short side portion 35c towards a harness-side second short side portion 35d. The reference recess 47 is formed in the vicinity of the harness-side first short side portion 35c.

In the harness-side connector 24B of the second harness 23B, as indicated in FIG. 11, the first to fourth openings 46a to 46d, and hence the first to fourth harness-side terminals 48a to 48d, are arranged in this order in a direction from the harness-side second short side portion 35d towards the harness-side first short side portion 35c; that is, in a direction opposite to the first direction. The reference recess 47 is formed in the vicinity of the harness-side second short side portion 35d.

Figure 9:
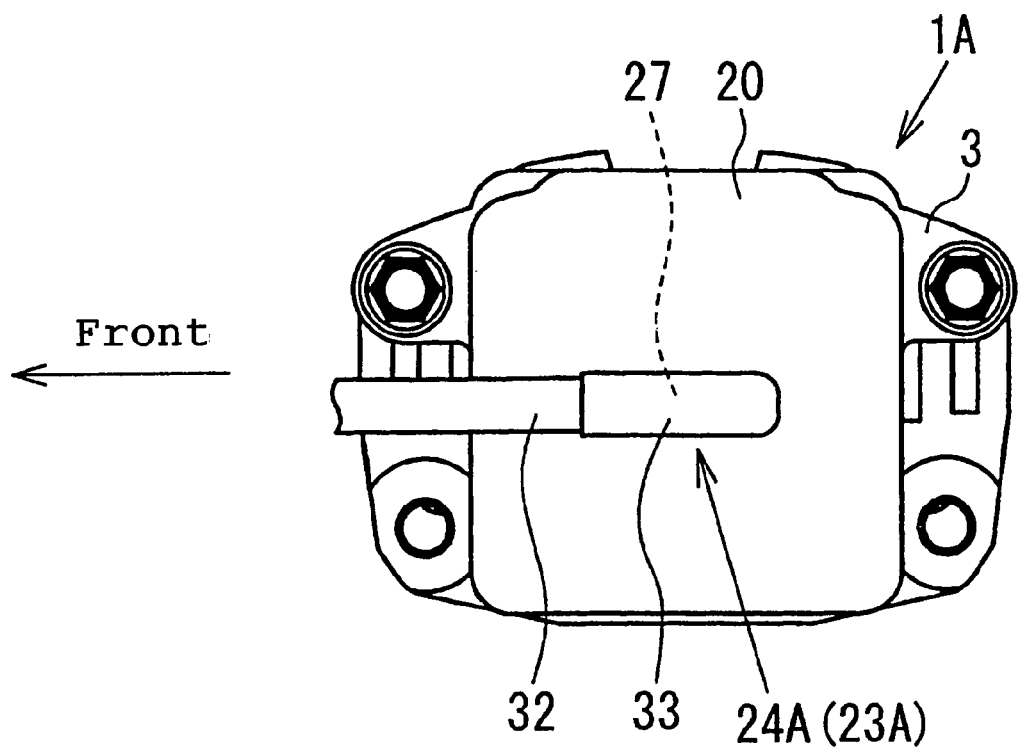
FIG. 9 is a rear view of the electric disk brake of FIG. 6 when mounted for the right rear wheel of the vehicle, with the first harness being attached thereto.

FIG. 6 and FIG. 9 indicate the electric disk brake 1A when mounted for use with the right rear wheel (not shown). In this state, the cover 20 is disposed such that the first and third side portions 20a and 20c are located on the front side and the rear side of the vehicle, respectively, with the first to fourth lead-out terminals 30a to 30d being arranged in this order from the front side towards the rear side of the vehicle, and the first harness 23A is attached to the caliper body 3 so that the harness cylinder portion 32 extends towards the front side of the vehicle.

If the electric disk brake 1A is mounted for use with the left rear wheel (in this case the first side portion 20a of the cover 20 faces the rear side of the vehicle), with the first harness 23A being attached to the caliper body 3 in the same manner as indicated in FIG. 6, the harness cylinder portion 32 is directed towards the rear side of the vehicle. That is, the direction of the harness cylinder portion 32 becomes opposite to that when the electric disk brake 1A is mounted for use with the right rear wheel. This impairs a smooth operation for wiring the harness 23 (the first harness 23A).

Figure 10:
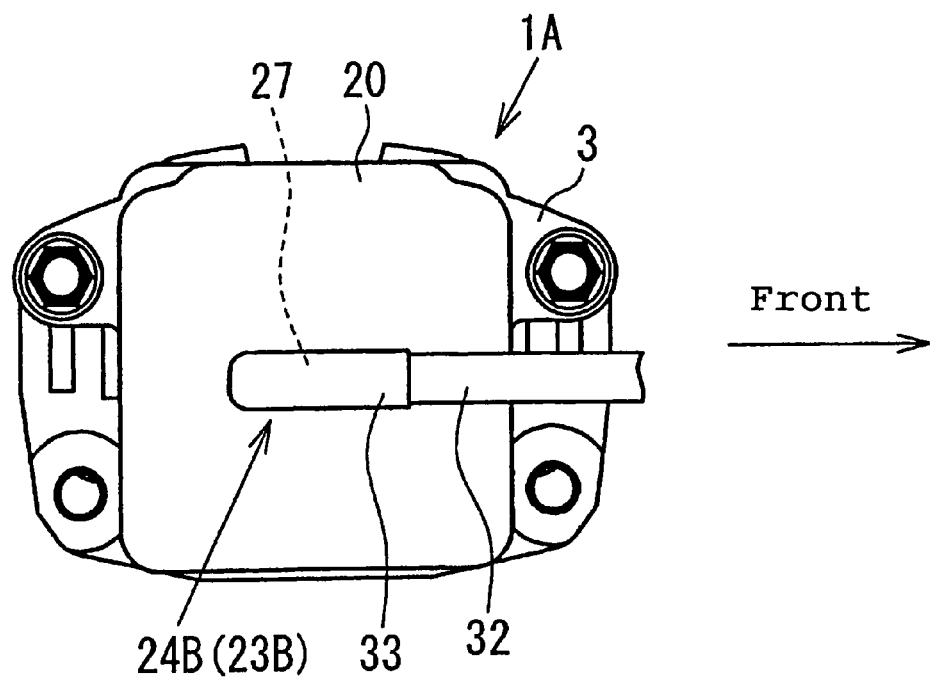
FIG. 10 is a rear view of the electric disk brake of FIG. 6 when mounted for the left rear wheel of the vehicle, with a second harness being attached thereto.

In the second embodiment, when the electric disk brake 1A is mounted for use with the left rear wheel (that is, the first to fourth lead-out terminals 30a to 30d are arranged in this order from the rear side towards the front side of the vehicle), as indicated in FIGS. 10 and 11, the second harness 23B is used, instead of the first harness 23A, and the harness-side connector body 33 is fitted over the caliper body-side connector body 27 such that the harness cylinder portion 32 extends towards the front side of the vehicle. Thus, the first to fourth lead-out terminals 30a to 30d are inserted into the first to fourth openings 46a to 46d and connected to the first to fourth harness-side terminals 48a to 48d. In this instance, the reference recess 47 of the second harness 23B is fitted over the reference projection 45.

By connecting the first to fourth lead-out terminals 30a to 30d to the first to fourth harness-side terminals 48a to 48d in the above-mentioned manner, the same electrical connecting relationship between the harness 23 and the electric portions for the electric motor as in the case of FIG. 6 can be obtained. Further, when the electric disk brake 1A is mounted for use with the left rear wheel using the second harness 23B, the harness cylinder portion 32 extends towards the front side of the vehicle as in the case of FIG. 6 in which the electric disk brake 1A is mounted for use with the right rear wheel using the first harness 23A. Therefore, ease of operation for wiring the harness (23A, 23B) can be ensured.

Further, an easy wiring operation can be achieved by disposing the harnesses 23A and 23B in the same direction, without preparing caliper bodies of different structures corresponding to the left and the right wheels. Since it is unnecessary to prepare a plurality of types of caliper bodies, production efficiency can be increased.

When the electric disk brake 1A is mounted for use with the left rear wheel, if it is intended to attach the first harness 23A such that the harness cylinder portion 32 extends towards the front side of the vehicle, the reference recess 47 of the first harness 23A does not exist at a portion corresponding to the reference projection 45, so that there is no possibility of the first harness 23A being erroneously attached to the caliper body 3.

Figure 12:
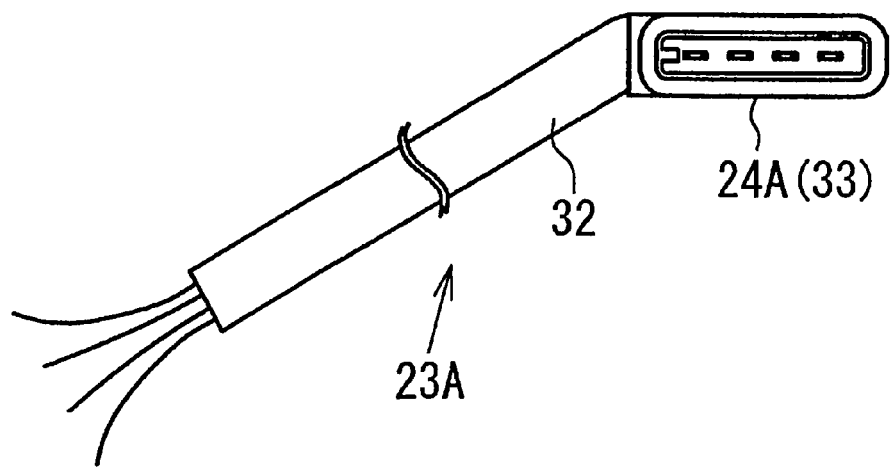
FIG. 12 is a front view of an example of a first harness which is used instead of the first harness of FIG. 8.
Figure 13:
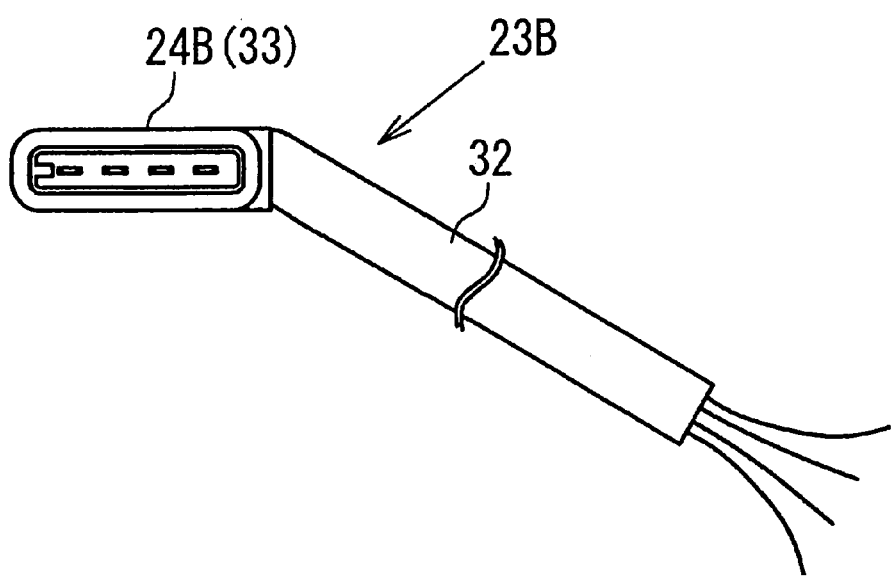
FIG. 13 is a front view of an example of a second harness which is used instead of the second harness of FIG. 11.

With respect to the first and second harnesses 23A and 23B, in the second embodiment, the harness cylinder portion 32 and the harness-side connectors 24A and 24B are linearly provided. However, this does not limit the present invention. As indicated in FIGS. 12 and 13, the harness-side connectors 24A and 24B may be inclined with a predetermined angle relative to the harness cylinder portion 32.

Next, referring to FIGS. 14 to 19, description is made with regard to an electric disk brake 1B according to a third embodiment of the present invention. The same or corresponding members or portions as indicated in FIGS. 1 to 13 are designated by the same reference numerals and characters as used in FIGS. 1 to 13, and overlapping explanation thereof is omitted.

The electric disk brake 1B in the third embodiment mainly differs from the electric disk brake 1A in the second embodiment in that the cover 20 is detachably attached to the case 11 by means of four bolts 50, two types of caliper bodies (a first caliper body 3A shown in FIGS. 14 and 15 and a second caliper body 3B shown in FIG. 18) that are different from each other only in terms of a direction of the cover 20 are prepared, and only a single type of harness [the first harness 23A (FIG. 17)] is used, instead of the first and second harnesses 23A and 23B used in the second embodiment.

Figure 14:
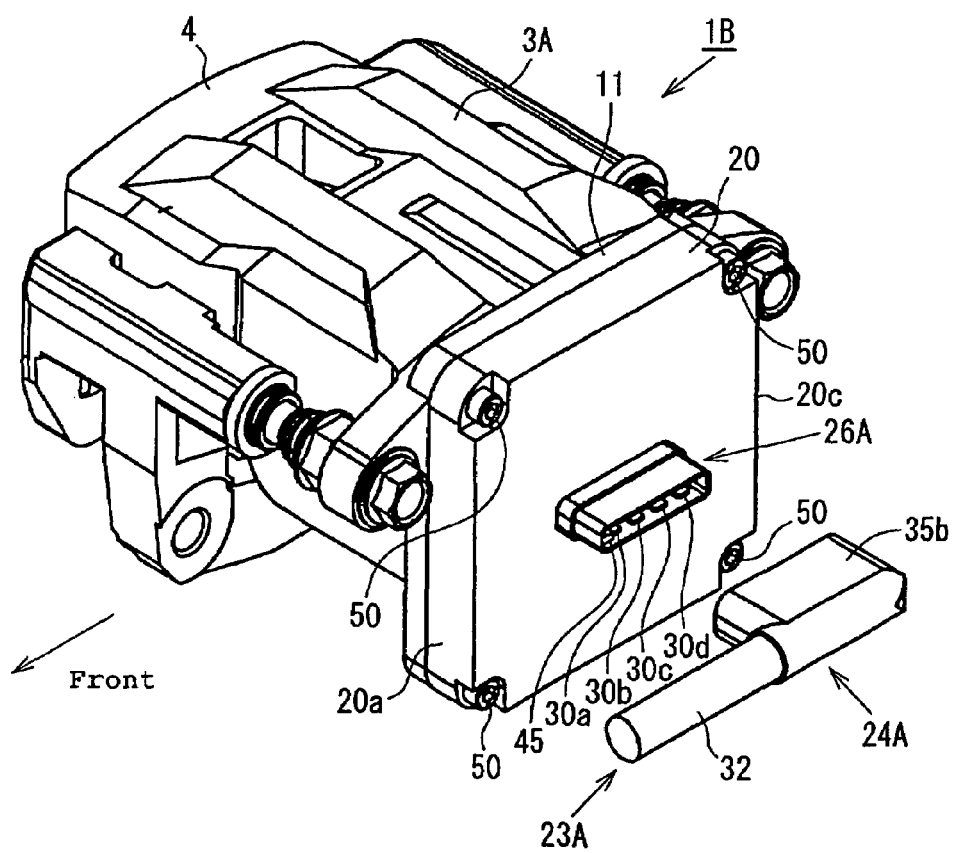
FIG. 14 is a disassembled perspective view schematically showing a disposition of an electric disk brake according to a third embodiment of the present invention when mounted for the right rear wheel of a vehicle.
Figure 15:
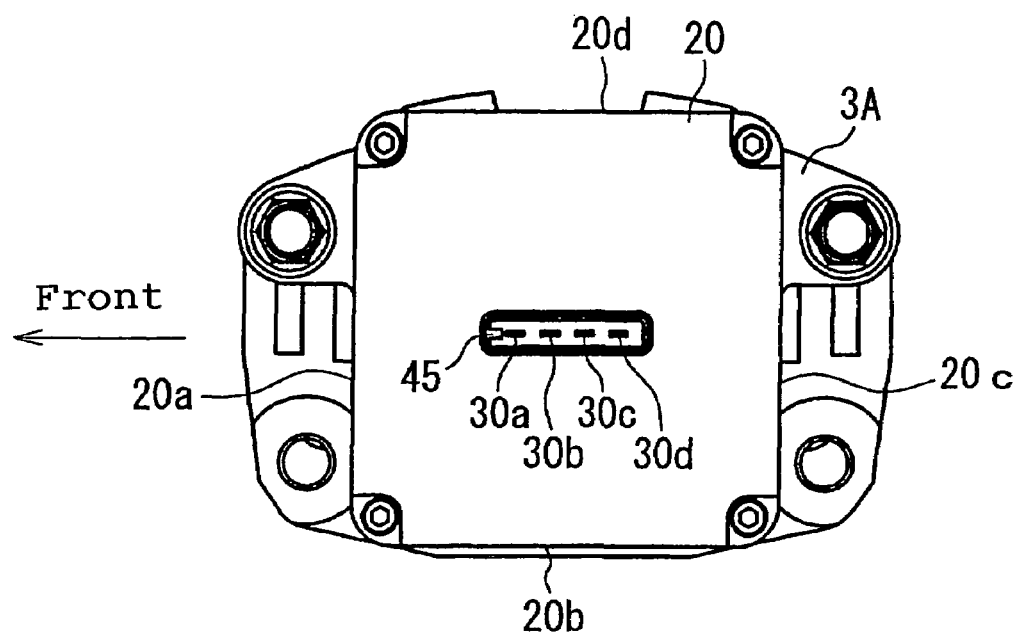
FIG. 15 is a rear view of a first caliper body of the electric disk brake of FIG. 14.
Figure 16:
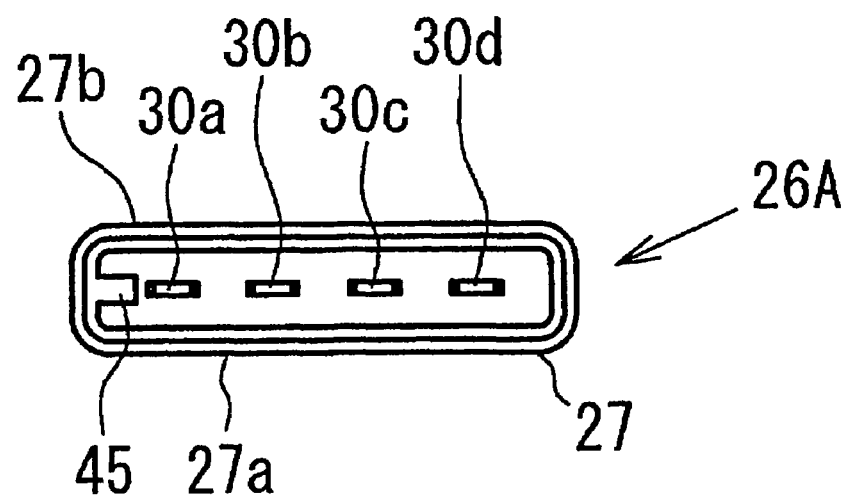
FIG. 16 is a plan view showing a caliper body-side connector shown in FIG. 14.
Figure 17:
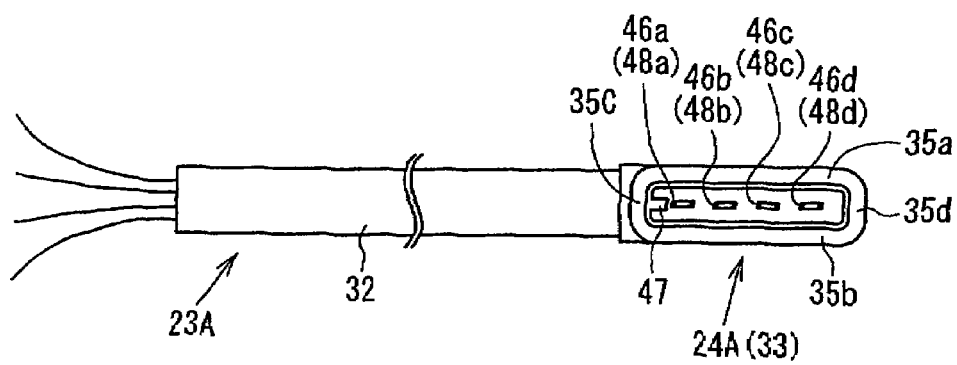
FIG. 17 is a front view showing a harness shown in FIG. 14.

As shown in FIGS. 14 and 15, the cover 20 of the first caliper body 3A is provided with the caliper body-side connector 26A having the same arrangements as that used in the second embodiment. In this case, the cover 20 of the first caliper body 3A is attached to the case 11 such that the first side portion 20a of the cover 20 (and hence the reference projection 45) is located on the left side when viewed in a direction facing the claw portion 4 (that is, the first to fourth lead-out terminals 30a to 30d are arranged from the left side towards the right side in FIG. 15).

The cover 20 of the second caliper body 3B includes the caliper body-side connector 26A as in the case of the first caliper body 3A. In this case, the cover 20 of the second caliper body 3B is attached to the case 11 such that the first side portion 20a of the cover 20 (and hence the reference projection 45) is located on the right side when viewed in a direction facing the claw portion 4 (that is, the first to fourth lead-out terminals 30a to 30d are arranged from the right side towards the left side in FIG. 18).

FIG. 14 and FIG. 15 indicate the electric disk brake 1B (the first caliper body 3A) when mounted for use with the right rear wheel (not shown). In this state, the cover 20 is disposed such that the first and third side portions 20a and 20c are located on the front side and the rear side of the vehicle, respectively, with the first to fourth lead-out terminals 30a to 30d being arranged in this order in a first direction from the front side towards the rear side of the vehicle, and the first harness 23A is attached to the caliper body 3A so that the harness cylinder portion 32 extends towards the front side of the vehicle.

If the electric disk brake 1B is mounted for use with the left rear wheel, with the first caliper body 3A being provided for the left rear wheel (in this case the first side portion 20a of the cover 20 faces the rear side of the vehicle), and with the first harness 23A being attached to the first caliper body 3A in a manner as indicated in FIG. 14, the harness cylinder portion 32 is directed towards the rear side of the vehicle. That is, the direction of the harness cylinder portion 32 becomes opposite to that when the electric disk brake 1B is mounted for use with the right rear wheel. This impairs a smooth operation for wiring the harness (the first harness 23A used for the right rear wheel and the first harness 23A used for the left rear wheel).

Figure 18:
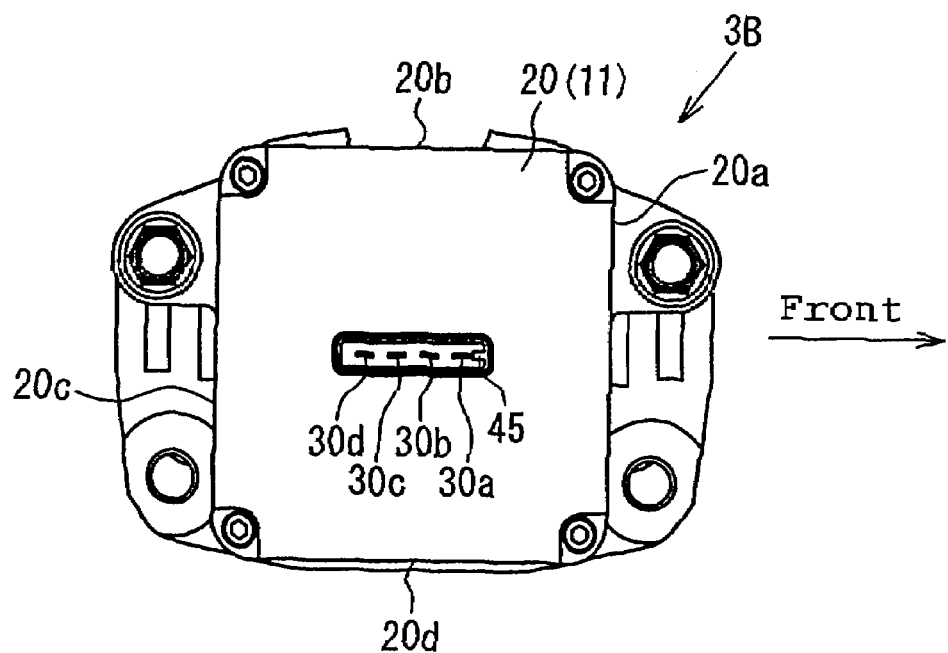
FIG. 18 is a rear view of a second caliper body (the electric disk brake) mounted for the right rear wheel of the vehicle.
Figure 19:
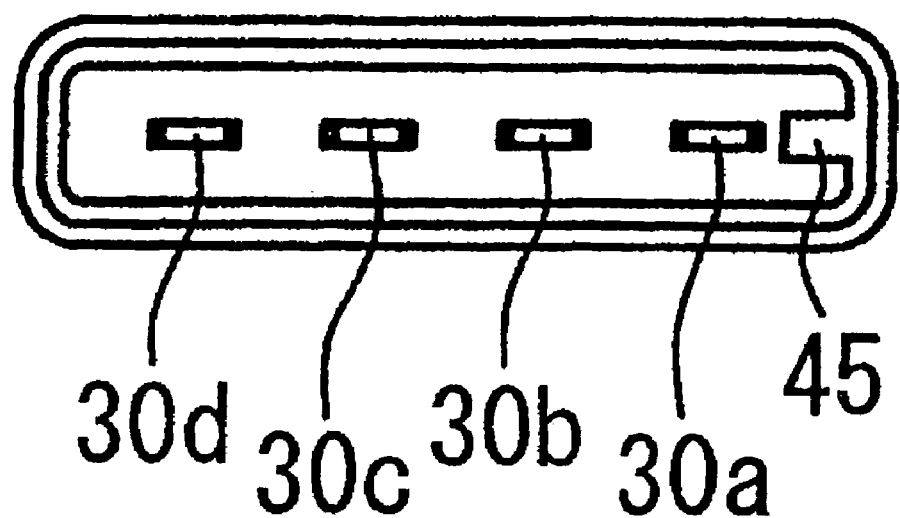
FIG. 19 is a plan view showing a caliper body-side connector shown in FIG. 18.

In the third embodiment, when the electric disk brake 1B is mounted for use with the left rear wheel, as indicated in FIGS. 18 and 19, the second caliper body 3B is provided for the left rear wheel, that is, the first to fourth lead-out terminals 30a to 30d are arranged in a direction opposite to the first direction (i.e., from the front side towards the rear side of the vehicle), and the first harness 23A is connected to the second caliper body 3B. In this instance, the reference recess 47 of the first harness 23A is fitted over the reference projection 45.

By connecting the first harness 23A to the second caliper body 3B in the above-mentioned manner, the same electrical connecting relationship between the harness 23 and the electric portions for the electric motor as in the case of FIG. 14 can be obtained. In this instance, the harness cylinder portion 32 extends towards the front side of the vehicle as in the case of FIG. 14 in which the electric disk brake 1B is mounted for use with the right rear wheel. Therefore, ease of operation for wiring the harness (the first harness 23A) can be ensured.

Further, an easy wiring operation can be achieved by disposing the harnesses (the first harnesses 23A) in the same direction, without preparing harnesses of different structures corresponding to the left and the right wheels. Therefore, production efficiency can be increased.

Figure 20:
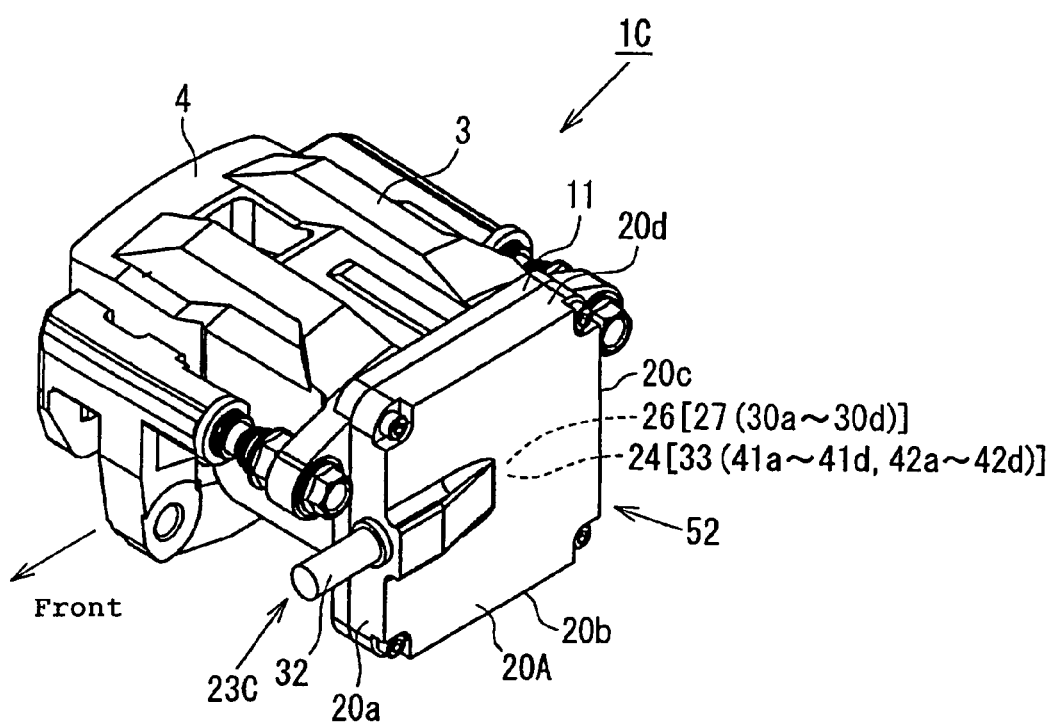
FIG. 20 is a perspective view schematically showing a disposition of an electric disk brake according to a fourth embodiment of the present invention when mounted for the right rear wheel of a vehicle.
Figure 21:
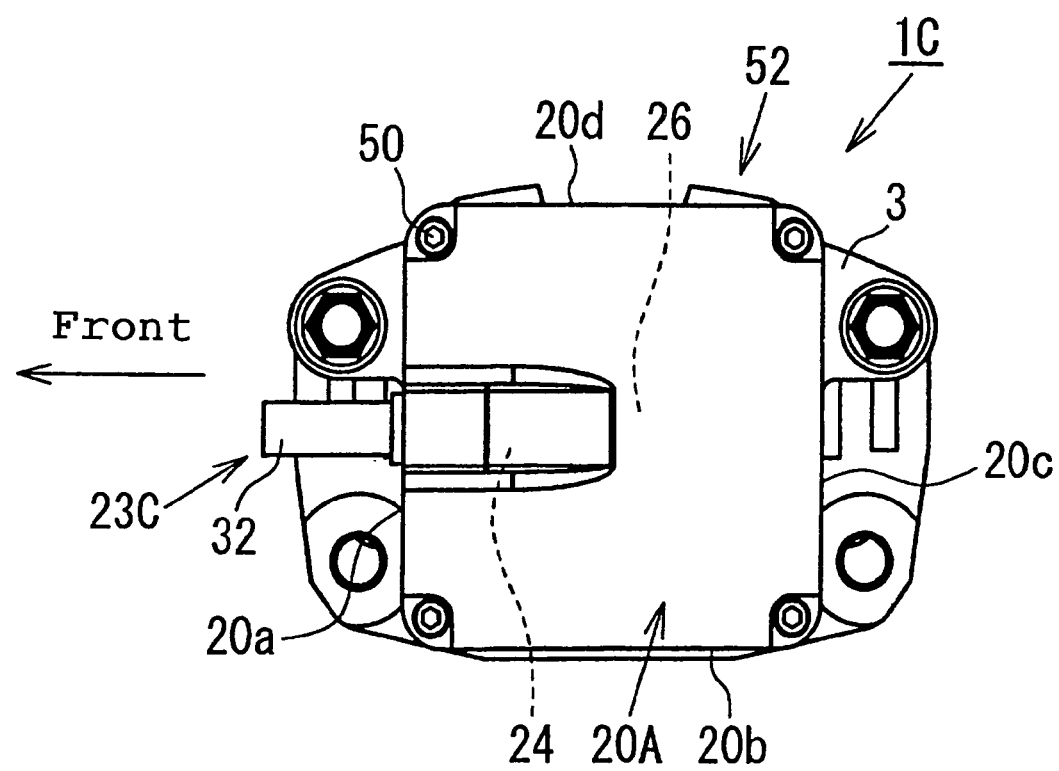
FIG. 21 is a rear view of the electric disk brake mounted for the right rear wheel of the vehicle.
Figure 22:
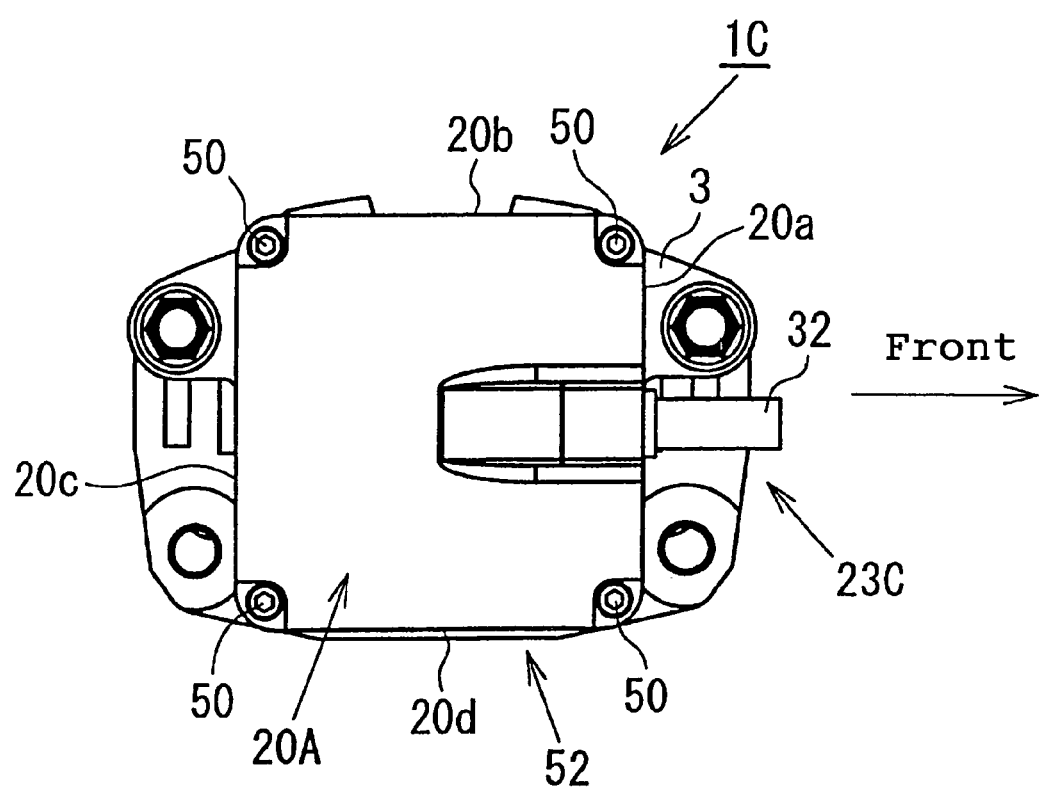
FIG. 22 is a rear view of the electric disk brake mounted for the left rear wheel of the vehicle.

Next, referring to FIGS. 20 to 22, description is made with regard to an electric disk brake according to a fourth embodiment of the present invention. The same or corresponding members or portions as indicated in FIGS. 1 to 19 are designated by the same reference numerals and characters as used in FIGS. 1 to 19, and overlapping explanation thereof is omitted.

An electric disk brake 1C in the fourth embodiment differs from the electric disk brake in the third embodiment in that a caliper body-side connector and a harness-side connector are provided between the case and the cover of the caliper. Specifically, the fourth embodiment differs from the third embodiment in the following points.

(1) Instead of the caliper body-side connector 26A in the third embodiment, the caliper body-side connector 26 having the same arrangements as that used in the first embodiment (FIG. 1 and FIG. 2) is used, and the caliper body-side connector 26 is provided in the case 11, not the cover 20 as used in the third embodiment.

(2) Only a single type of a caliper body (the caliper body 3) is provided, instead of preparing the two types of caliper bodies (the first and second caliper bodies 3A and 3B).

(3) In the third embodiment, the cover 20 and the first harness 23A (the harness-side connector 24) are separated. In the fourth embodiment, a cover portion 20A corresponding to the cover 20 in the third embodiment and the harness-side connector 24 such as that provided in the harness 23 in the first embodiment are formed as a unit, to thereby form a harness fixing part 52.

(4) As a harness, use is made of a harness 23C having substantially the same arrangements as the harness 23 in the first embodiment (FIG. 3). The harness 23C comprises the harness-side connector 24 including the first-set first to fourth harness-side terminals 41a to 41d and the second-set first to fourth harness-side terminals 42a to 42d.

The caliper body-side connector body 27 (not shown) of the caliper body-side connector 26 (not shown) having the same arrangements as that in the first embodiment is attached to a substantially central portion of the case 11. In the caliper body-side connector body 27, the first to fourth lead-out terminals 30a to 30d are arranged in this order from the left side (the left side in FIG. 20) towards the right side (the right side in FIG. 20) when viewed in a direction facing the claw portion 4.

The harness fixing part 52 comprises the cover portion 20A attached to the rear end portion of the case 11. The cover portion 20A is substantially rectangular, and has the first to fourth side portions 20a to 20d. The harness 23C having a part thereof integral with the cover portion 20A is connected to the first side portion 20a of the cover portion 20A.

The harness 23C includes the harness-side connector 24 (not shown) having the same arrangements as that in the first embodiment. The harness-side connector 24 includes the first-set and second-set first to fourth harness-side terminals 41a to 41d and 42a to 42d which are connected to the first to fourth lead-out terminals 30a to 30d.

The first-set first to fourth harness-side terminals 41a to 41d and the second-set first to fourth harness-side terminals 42a and 42d, which are disposed in two rows, are in reverse order relative to each other in terms of an order of arrangement and independently connected to the first to fourth lead-out terminals 30a to 30d. That is, the first-set first harness-side terminal 41a and the second-set first harness-side terminal 42a are disposed with a relation of point symmetry with respect to the center of the substrate 34 (the connector 33). Similarly, the terminals 41b and 42b, the terminals 41c and 42c, and the terminals 41d and 42d are disposed with a relation of point symmetry with respect to the center of the substrate 34 (the connector 33).

FIG. 20 and FIG. 21 indicate the electric disk brake 1C when mounted for use with the right rear wheel (not shown). In this state, the cover portion 20A of the harness fixing part 52 is disposed such that the first and third side portions 20a and 20c are located on the front side and the rear side of the vehicle, respectively, with the first to fourth lead-out terminals 30a to 30d being arranged in this order from the front side towards the rear side of the vehicle, and the harness 23C is attached so that the harness cylinder portion 32 extends towards the front side of the vehicle.

If the electric disk brake 1C is mounted for use with the left rear wheel (in this case the first side portion 20a of the cover portion 20A faces the rear side of the vehicle), with the harness fixing part 52 being attached to the caliper body 3 in the same manner as indicated in FIG. 20, the harness cylinder portion 32 is directed towards the rear side of the vehicle. That is, the direction of the harness cylinder portion 32 becomes opposite to that when the electric disk brake 1C is mounted for use with the right rear wheel (FIG. 20). This impairs a smooth operation for wiring the harness 23.

In the fourth embodiment, when the electric disk brake 1C is mounted for use with the left rear wheel (that is, the first side portion 20a of the cover portion 20A faces the rear side of the vehicle and the first to fourth lead-out terminals 30a to 30d are arranged in this order from the rear side towards the front side of the vehicle), the direction of the harness fixing part 52 (the cover portion 20A) attached to the case 11 by means of the bolts 50 is changed.

That is, referring to FIG. 22, the harness fixing part 52 (the cover portion 20A) is attached to the case 11 such that the harness cylinder portion 32 extends towards the right side in FIG. 22 (the front side of the vehicle). Due to this attachment, the harness-side connector body 33 is fitted over the caliper body-side connector body 27, thus inserting the first to fourth lead-out terminals 30a to 30d into the second-row first to fourth openings 39a to 39d (see FIG. 3) for connection with the second-set first to fourth harness-side terminals 42a to 42d. By connecting the first to fourth lead-out terminals 30a to 30d to the second-set first to fourth harness-side terminals 42a to 42d in the above-mentioned manner, the same electrical connecting relationship between the harness 23C and the electric portions for the electric motor as in the case of FIG. 20 can be obtained. In this instance, the harness cylinder portion 32 extends towards the front side of the vehicle as in the case of FIG. 20 in which the electric disk brake 1C is mounted for use with the right rear wheel. Therefore, ease of operation for wiring the harness 23C can be ensured.

Further, an easy wiring operation can be achieved by disposing the harnesses 23C in the same direction, without preparing caliper bodies of different structures corresponding to the left and the right wheels. Since it is unnecessary to prepare a plurality of types of caliper bodies, production efficiency can be increased.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2004-223704 filed on Jul. 30, 2004 including specification, claims, drawings and summary is incorporated herein by reference in its entirety.

What is claimed is:

1. An electric disk brake which is adapted to generate a braking force by pressing brake pads against a disk rotor by means of an electric motor provided in a caliper body and in which an electric portion for said electric motor and a predetermined number of wires provided in a harness are connected and disconnected by means of a connector, wherein:

said connector comprises a caliper body-side connector and a harness-side connector respectively provided in said caliper body and said harness;

said caliper body-side connector includes a set of a predetermined number of caliper body-side terminals connected to said electric portion for the electric motor;

said harness-side connector includes a set of a predetermined number of harness-side terminals connected to one end of each of said predetermined number of wires, said wires in said harness extending from said harness-side connector in a direction along a disk surface of said disk rotor when said harness-side connector is attached to said caliper body-side connector;

one of said harness and said caliper body includes two types, one of the two types being formed such that the predetermined number of terminals of the connector are arranged in a first direction and the other type being formed such that the predetermined number of terminals of the connector are arranged in a direction opposite to said first direction, the other of said harness and said caliper body includes a single type, the predetermined number of terminals of the connector being arranged in a predetermined direction, and said wires in said harness mounted for use with a right wheel and those in said harness mounted for use with a left wheel can extend in a direction towards the same side of a vehicle, by selection of said two types.

2. An electric disk brake according to claim 1, wherein the caliper body includes two types, one of the two types being a first caliper body comprising the caliper body-side connector in which the predetermined number of caliper body-side terminals corresponding to the predetermined number of harness-side terminals are arranged in the first direction, and the other of the two being a second caliper body comprising the caliper body-side connector in which the predetermined number of caliper body-side terminals are arranged in the direction opposite to the first direction.

3. An electric disk according to claim 1, wherein said caliper body-side connector is provided on an outer side of said caliper body.

4. An electric disk brake according to claim 1, wherein the harness includes, as said two types, a first harness comprising the harness-side connector in which the predetermined number of harness-side terminals corresponding to the predetermined number of caliper body-side terminals are arranged in the first direction and a second harness comprising the harness-side connector in which the predetermined number of harness-side terminals are arranged in the direction opposite to the first direction, and wherein the caliper body includes a single type of the caliper body comprising the caliper body-side connector in which the predetermined number of caliper body-side terminals connected to said electric portion for the electric motor are arranged in a predetermined direction.

5. An electric disk brake according to claim 4, wherein the harness-side connector of the first harness is connected to the caliper body-side connector of the caliper body mounted for use with the right wheel of the vehicle, and the harness-side connector of the second harness is connected to the caliper body-side connector of the caliper body mounted for use with the left wheel of the vehicle.

6. An electric disk brake according to claim 5, wherein an alignment means is provided between the caliper body-side connector and the harness-side connector, and the alignment means in the harness-side connector of the first harness is provided at a position opposite to a position corresponding to a position of the alignment means in the harness-side connector of the second harness.

7. An electric disk brake according to claim 2, wherein the caliper body-side connector and the harness-side connector are provided with an alignment means adapted to conduct alignment between the caliper body-side connector and the harness-side connector when they are fittingly connected to each other.

8. An electric disk brake according to claim 7, wherein the alignment means comprises a reference projection provided in either one of the caliper body-side connector and the harness-side connector and a reference recess provided in the other.

9. An electric disk brake which is adapted to generate a braking force by means of an electric motor provided in a caliper body and in which an electric portion for said electric motor and a predetermined number of wires provided in a harness are connected and disconnected by means of a connector, wherein:
said connector comprises a caliper body-side connector and a harness-side connector respectively provided in said caliper body and said harness, each of said caliper-side connector and said harness-side connector having a substantially rectangular shape having opposite first and second long sides and opposite first and second short sides, said wires in said harness being adapted to extend in a longitudinal direction in which said first and second long sides of said harness-side connector extend;
said caliper body-side connector includes a set of a predetermined number of caliper body-side terminals connected to said electric portion for the electric motor;
said harness-side connector includes a set of a predetermined number of harness-side terminals connected to one end of each of said predetermined number of wires; and
one of said harness and said caliper body includes two types, one of the two types being formed such that the predetermined number of terminals of the connector are arranged in a first direction from said first short side toward said second short side along said first and second long sides and the other type being formed such that the predetermined number of terminals of the connector are arranged in a direction opposite to said first direction,
the other of said harness and said caliper body includes a single type, the predetermined number of terminals of the connector being arranged in a predetermined direction, and one of said two types is selected according to a direction in which said wires in said harness extends.

10. An electric disk brake according to claim 9, wherein said caliper body-side connector is provided on an outer side of said caliper body.

11. An electric disk brake according to claim 9, wherein the harness includes, as said two types, a first harness comprising the harness-side connector in which the predetermined number of harness-side terminals corresponding to the predetermined number of caliper body-side terminals are arranged in the first direction and a second harness comprising the harness-side connector in which the predetermined number of harness-side terminals are arranged in the direction opposite to the first direction.

12. An electric disk brake according to claim 11, wherein said first harness is provided, at said first short side of the connector of the first harness, with an alignment means adapted to conduct alignment between the caliper body-side connector and the harness-side connector of the first harness when they are fittingly connected to each other,
wherein said second harness is provided, at said second short side of the connector of the second harness, with an alignment means adapted to conduct alignment between the caliper body-side connector and the harness-side connector of the second harness when they are fittingly connected to each other, and
wherein said caliper body-side connector is provided, at one of said first or second short side of the connector, with an alignment means adapted to conduct alignment between the caliper body-side connector and the harness-side connector when they are fittingly connected to each other.

13. An electric disk brake according to claim 12, wherein said alignment means comprises a reference projection provided in either one of the caliper body-side connector and the harness-side connector and a reference recess provided in the other.

14. An electric disk brake according to claim 9, wherein the caliper body includes, as said two types, a first caliper body comprising the caliper body-side connector in which the predetermined number of caliper body-side terminals corresponding to the predetermined number of harness-side terminals are arranged in the first direction, and a second caliper body comprising the caliper body-side connector in which the predetermined number of caliper body-side terminals are arranged in the direction opposite to the first direction.

15. An electric disk brake according to claim 14, wherein:
said first caliper body is provided, at said first short side of the connector of the first caliper body, with an alignment means adapted to conduct alignment between the caliper body-side connector of the first caliper body and the harness-side connector when they are fittingly connected to each other,
said second caliper body is provided, at said second short side of the connector of the second caliper body, with an alignment means adapted to conduct alignment between the caliper body-side connector of the second caliper body and the harness-side connector when they are fittingly connected to each other, and
said harness-side connector is provided, at one of said first or second short sides of the connector, with an alignment means adapted to conduct alignment between the caliper body-side connector and the harness-side connector when they are fittingly connected to each other.

16. An electric disk brake according to claim 15, wherein said alignment means comprises a reference projection provided in either one of the caliper body-side connector and the harness-side connector and a reference recess provided in the other.

* * * * *